United States Patent [19]

Prewo

[11] Patent Number: 5,116,398
[45] Date of Patent: May 26, 1992

[54] PROCESS FOR FORMING FIBER REINFORCED COMPOSITE ARTICLES

[75] Inventor: Karl M. Prewo, Vernon, Conn.

[73] Assignee: United Technologies Corporation, Hartford, Conn.

[21] Appl. No.: 527,148

[22] Filed: May 23, 1990

[51] Int. Cl.⁵ .............................................. C03C 25/00
[52] U.S. Cl. .................................. 65/18.1; 65/32.1; 65/102; 65/103; 264/113; 264/125
[58] Field of Search ............. 65/18.1, 32.1, 102, 65/103; 264/109, 112, 113, 123, 125

[56] References Cited

U.S. PATENT DOCUMENTS

| | | | |
|---|---|---|---|
| 2,961,771 | 10/1960 | Brooke | 65/18.1 X |
| 4,324,843 | 4/1982 | Brennan et al. | 428/697 |
| 4,464,192 | 8/1984 | Layden et al. | 65/18.1 |
| 4,511,663 | 4/1985 | Taylor | 501/4 |
| 4,581,053 | 4/1986 | Prewo et al. | 65/4.21 |
| 4,606,874 | 8/1986 | Hrovat et al. | 264/56 |
| 4,613,473 | 9/1986 | Layden et al. | 264/103 |
| 4,664,731 | 5/1987 | Layden et al. | 156/89 |
| 4,666,645 | 5/1987 | Prewo et al. | 264/87 |
| 4,780,432 | 10/1988 | Minford et al. | 501/32 |
| 4,857,093 | 8/1989 | Prewo et al. | 65/36 |
| 4,921,518 | 5/1990 | Allaire et al. | 65/18.1 |

*Primary Examiner*—Robert L. Lindsay
*Attorney, Agent, or Firm*—Perman & Green

[57] ABSTRACT

A method of manufacturing a glass or glass-ceramic matrix composite article is disclosed which serves to eliminate the need for an expensive vacuum hot press and to significantly reduce the time required for densification. A preform composed of a mixture of chopped or continuous fibers such as carbon or silicon carbide and glass powder is heated to a temperature sufficiently high to soften the glass powder to a deformable state. Thereupon, the preform is deformed between dies which are at a temperature below that of the preform. A resultant composite article assumes the configuration of the shaped die cavity and is cooled by the natural loss of heat to the dies.

11 Claims, 1 Drawing Sheet

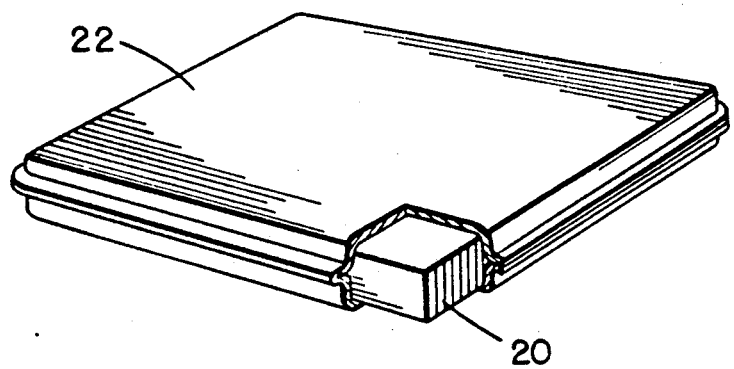
FIG. 1B.
FIG. 1A.
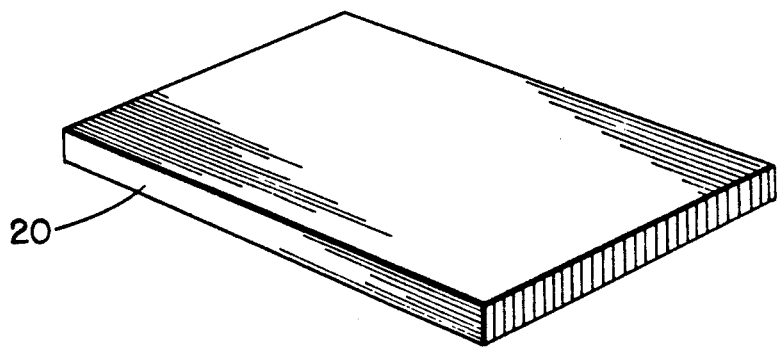
FIG. 2.
FIG. 3.
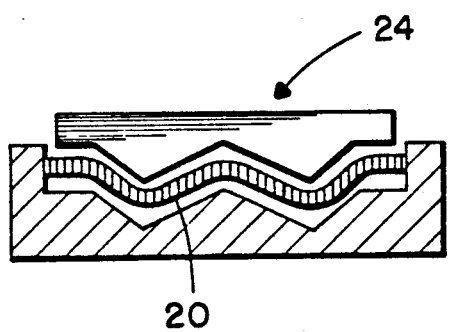
FIG. 4.
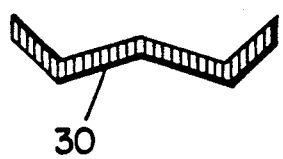
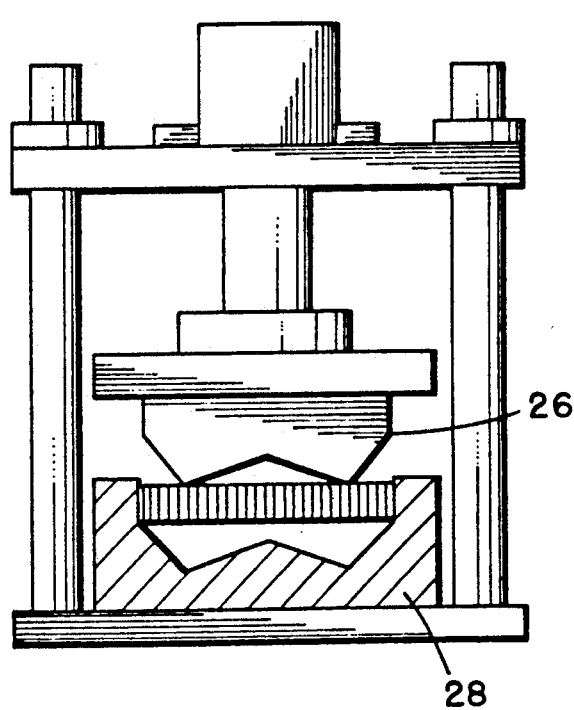

PROCESS FOR FORMING FIBER REINFORCED COMPOSITE ARTICLES

BACKGROUND OF THE INVENTION

1. Field of the Invention

The present invention relates generally to an improved process for forming fiber reinforced glass matrix or glass-ceramic matrix composite articles.

2. Description of the Prior Art

Because of the high density, temperature limitations, scarcity, and increasing expense of many conventional high temperature structural metals, increased attention has focused on non metal containing composites as replacements for conventional high temperature metal containing materials. Use of metal replacement high strength fiber reinforced resin and even high strength fiber reinforced metal matrix composites has progressed to the point of commercial acceptance in products ranging from sporting goods to automotive parts to advanced jet aircraft components. Such composite materials exhibit properties of high strength, toughness, and wear resistance. Additionally, frictional characteristics of composite materials, whether high or low, can be tailored to satisfy particular requirements.

Techniques have been disclosed which describe fabrication processes for making fiber reinforced glass and glass-ceramic composites, two of which are commonly assigned U.S. Pat. No(s). 4,324,843 and 4,613,473, the disclosures of which are incorporated herein by reference.

In the technique disclosed in U.S. Pat. No. 4,324,843, a tow of fibers, for example, silicon carbide, is continuously unwound from a spool at a moderate rate of speed and passed through a slip of powdered ceramic, liquid carrier and binder to impregnate the tow. The impregnated fibers are then rewound onto a larger rotating spool. An exemplary slip composition may be composed of 40 gm. of powdered glass ceramic and 780 ml. of water and 20 gm. of suitable organic binder such as that produced by Rhom and Haas Co. of Philadelphia, Penna. under the trademark "RHOPLEX". The coated fibers are then appropriately dried, forming a matrix impregnated tape. The matrix impregnated tape is then cut into desired lengths or shapes and laid up in proper fiber orientation, after which they are placed in an oven to burn off the binder. Then the lay-up is carefully placed in a mold and densified under heat and pressure forming the composite. Such densification is typically performed by hot pressing either under vacuum or inert gas such as argon in metal dies coated with colloidal boron nitride or graphite dies sprayed with boron nitride powder at pressures of 6.9-13.8 MPa (1000-2000 psi) and temperatures of 1100°-1550° C. Time of hot pressing will vary depending on composite makeup but generally will be accomplished between about 10 minutes and 1 hour.

In the technique disclosed in U.S. Pat. No. 4,613,473, glass, glass-ceramic or ceramic matrix material is formed into fibers. The technique then entails forming these fibers into yarn, then weaving, braiding, or knitting the yarn into a homogenous cloth of the matrix material. Thereupon, fibers of reinforcing material are prepared, then yarns of the reinforcing fibers, following which these yarns are then knitted or woven into a homogenous cloth of fiber reinforcement. In a subsequent step, a plurality of preforms of predetermined shape are cut from each of the cloths, the fiber reinforcing cloth preforms being interleaved with one or more layers of the matrix cloth preforms forming a lay-up. This lay-up is then placed in a die and densified under heat and pressure to form the composite article. The densification step is typically performed in the same manner as that indicated above with respect to the technique of the '843 patent.

There are a number of disadvantages associated with the densification step of these composite article manufacturing techniques, however. In a first instance, the equipment required is large, expensive, and costly to operate and maintain. Furthermore, it requires a substantial length of time in order to draw down the appropriate vacuum or provide the requisite inert atmosphere appropriate to the particular materials of the composite item.

Therefore, what is needed in this art is a method of manufacturing fiber reinforced composite articles which requires less costly equipment, has reduced energy requirements, and can achieve an end product in significantly less time.

SUMMARY OF THE INVENTION

It was in light of the foregoing that the present invention has been conceived. To this end, a method of manufacturing a composite article has been devised which serves to eliminate the need for the expensive vacuum hot press step and equipment and to significantly reduce the time required for densification. A preform composed of a mixture of continuous, woven, or chopped fibers such as carbon or silicon carbide and glass powder or glass-ceramic powder is heated to a temperature sufficiently high to soften the glass or glass-ceramic powder to a deformable state. Thereupon, the preform is deformed between dies which are at a temperature below that of the preform. A resultant composite article assumes the configuration of the shaped die cavity and is cooled by the natural loss of heat to the dies.

The invention has as its basis the observation that glass and glass-ceramic matrices can be rapidly densified under pressure and at an elevated temperature. They do not require time for chemical reactions to occur and the individual glass regions weld together immediately upon contact.

One object of the invention, therefore, is the provision of a densification process used in the manufacture of a composite article which eliminates the need for a vacuum hot press and for the step in the process therefor which requires the heat, energy to evacuate, and time previously needed for densification.

Another object of the invention is the manufacture of a composite article composed of a mixture of chopped fibers and glass or glass-ceramic powder according to which, when raised to a temperature sufficiently high to soften the glass powder to a deformable state, causes the individual glass regions to weld together. Still another object of the invention is the provision of a process for manufacturing a composite article according to which the step for densifying the mixture of chopped fibers and glass powder can be unitary with the step of shaping the resultant article.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 1a is a diagrammatic perspective view of a pre-consolidated or unconsolidated glass matrix composite preform obtained during an initial step of the invention;

FIG. 1b is a diagrammatic perspective view of the glass matrix composite preform placed within a suitable envelope;

FIG. 2 is a diagrammatic elevational view of a composite preform positioned within a premold die set;

FIG. 3 is a diagrammatic elevational view illustrating a preheated glass matrix composite preform in position between lower temperature dies awaiting the densification step of the invention; and FIG. 4 is a diagrammatic view of a fully densified glass matrix composite article resulting from operation of the invention.

DETAILED DESCRIPTION OF THE PREFERRED EMBODIMENTS

As previously mentioned, the present invention results from recognition of the fact that glass and glass-ceramic matrices can be rapidly densified under pressure and elevated temperature. At the same time, they do not require time for chemical reactions to take place and the individual glass regions weld together immediately upon contact.

According to the process of the invention, a preform 20 (FIG. 1a) is prepared. In one instance, a suitable envelope 22 (FIG. 1b) containing a mixture of chopped fibers and glass powder is prepared. The chopped fibers may be of any suitable composite reinforcing material, for example, carbon, graphite, silicon carbide, alumina, and the like and may be formed using any of the conventional fiber forming techniques, for example, drawing, spinning, and the like. A limiting factor in selecting the reinforcement material is its thermal compatibility with the temperatures required to densify the matrix and the physical compatibility (i.e. coefficients of thermal expansion should be closely matched, reactivity, and the like), between it and the matrix. The particular reinforcement material chosen will also depend upon the properties desired in the final composite article. Again, the diameter, length, and design of the fibers is not critical to the invention. However, it is preferred that the fibers be substantially round and have a diameter ranging from about 5 microns to about 150 microns with about 5 to about 25 microns being preferred to preserve fiber flexibility.

The mixture of chopped fibers in glass powder may be fully dense or may be an undensified molding compound. In this instance, the molding compound comprises a mixture of chopped fibers and glass or glass-ceramic in either a rigidized or loose form. In both of these cases, however, the molding compound contains extensive porosity which must be removed during the pressing step to follow. In the instance of the fully dense preform, the chopped fibers and glass or glass ceramic have been previously densified into a composite material article of convenient shape and size which contains little or no porosity. This fully dense preform has the advantage of being more compact and does not contain any pores which could contain air or inert gas which must be expelled during the final pressing step. Thus the final step becomes one of simply shaping the composite article. This densified preform, however, will be more expensive.

The envelope 22 may be composed of a metal, solid glass, or even of a sintered glass frit which, through sintering, has become impermeable to the atmosphere. The envelope may be of a shape tailored to yield at the conclusion of the process the final shape desired.

If the constituents of the composite would not deteriorate when heated in an ambient atmosphere, or if the amount of change or deterioration would be acceptable for an intended use, then an envelope would not be needed. In the event the use of an envelope is warranted, it would be suitably sealed and evacuated. In certain instances, an inert or non oxidizing atmosphere, such as argon or nitrogen, might be introduced into the envelope.

In another instance of preparing the preform, a ply lay up may again be provided within an envelope, if desired, although an envelope is not necessary, as previously mentioned. In this instance, a plurality of layers of continuous reinforcing fibers are laid up with each layer also containing glass or glass-ceramic powder of the desired matrix. The fibers within each layer are generally parallel and the longitudinal axes of the fibers within each subsequent layer are either parallel to or at some angle to that of its neighbor. Again, if an envelope were used, it would be sealed, then evacuated, or an inert atmosphere introduced.

In yet another instance of preparing a preform, both the reinforcement and matrix material would be formed into fibers and yarns. In one instance, one layer or ply might be of matrix cloth and its neighboring ply of reinforcement cloth. In another instance, each ply may be hybrid cloth prepared from both matrix yarn and reinforcement yarn, one being used for the warp and one being used for the weft. In yet another instance the matrix fibers and reinforcement fibers may be commingled into a single yarn which is woven into cloth. In any event, a lay up is prepared from plies of the woven cloth, it being important that the cloth be constructed in such a manner as to be readily deformable to the final shaped article required. As in the preceding instance, the lay up of plies of woven cloth may be placed within an envelope if the constituents of the composite material would deteriorate upon heating or if the amount of change or deterioration would not be acceptable. Otherwise, an envelope would not be necessary.

In any of the instances mentioned above, the preform, whether an envelope is utilized or not, is heated to a temperature sufficiently high to soften the glass to a deformable state. A typical temperature for this step may lie within the range of 800° C. to 1300° C. At this stage of the process, the preform is said to be either "pre-consolidated" or rigidized such that it has handleability. In this condition, the preform can be moved from place to place without undue concern for its welfare although it does not yet exhibit a final desired shape. It may also be a non rigidized material whose handleability is either provided through the use of an outer envelope or which, if without an envelope, must be handled by careful means for final positioning. It will be appreciated as desirable to place the preform in a mold 24, which may be termed a "pre-mold", generally having the shape of the desired end product. In this way, the preform would be more readily received and efficiently operated upon by the dies used for the next step in the process of the invention.

In a final step of the process of the invention, the heated preform is then set between dies 26, 28 (FIG. 2) which are at a temperature below that of the preform. The dies are then quickly closed, deforming the preform to fill the shaped die cavity. As the shaping takes place, the resulting composite article 30 is cooled by the natural loss of heat to the dies. In this manner, the composite article assumes and maintains its desired end shape (FIG. 3) and the process is completed in a minimum amount of time.

By reason of the foregoing process, the previously required step of densifying the preform using the vacuum hot press method and apparatus is no longer necessary. This results in a substantial savings in capital equipment and for its maintenance and operation. Furthermore, while the preform is heated to a temperature within the range of 800° to 1300° C., this heating is performed external to the high pressure press dies and hence does not occupy these expensive dies for long periods of time. Similarly the dies are never heated to the maximum temperature of the preform thus extending their useful life and also permitting the use of less expensive lower temperature die materials. Thus, according to the present invention, densification occurs as the dies are closed, then shortly thereafter reopened to discharge the completed article. There is, therefore, essentially much shorter residence time required in the process of the present invention.

It should be understood that the invention is not limited to the particular embodiments described herein, but that various changes and modifications may be made without departing from the spirit and scope of this novel concept as defined by the following claims.

What is claimed is:

1. A method of manufacturing a glass matrix or glass-ceramic matrix composite article comprising the steps of:
   (a) providing a preform composed of a mixture of reinforcing fiber material and glass or glass-ceramic matrix material;
   (b) heating the preform external of die means to a temperature sufficiently high to soften the glass or glass-ceramic powder to a deformable state;
   (c) deforming the preform in die means defining a shaped die cavity having an initial temperature below that of the preform; and
   (d) cooling the deformed preform by the natural loss of heat to the die means resulting in a composite article assuming the configuration of the shaped die cavity.

2. A method of manufacturing a composite article as set forth in claim 1
   wherein step (a) includes the step of:
   (e) isolating the preform from the surrounding atmosphere.

3. A method of manufacturing a composite article as set forth in claim 2
   wherein step (e) includes the steps of:
   (f) providing an envelope containing the preform;
   (g) sealing the envelope; and
   (h) introducing a modified atmosphere into the interior of the envelope to isolate the preform from harmful substances.

4. A method of manufacturing a composite article as set forth in claim 3
   wherein step (h) includes the step of
   (i) evacuating the interior of the envelope.

5. A method of manufacturing a composite article as set forth in claim 3
   wherein step (h) includes the step of:
   (j) introducing an inert atmosphere into the interior of the envelope.

6. A method of manufacturing a composite article as set forth in claim 1
   wherein the preform of step (a) is composed of chopped reinforcing fiber material and glass or glass-ceramic powder.

7. A method of manufacturing a composite article as set forth in claim 1
   wherein the preform of step (a) is composed of a lay up of a plurality of layers of generally parallel fibers of reinforcing material, said layers also containing glass or glass-ceramic powder of the matrix composition, the fibers of adjacent layers being parallel or angularly disposed.

8. A method of manufacturing a composite article as set forth in claim 1
   wherein the preform of step (a) is composed of a lay up of a plurality of plies of woven cloth, every other ply being composed of reinforcement fiber material, and each intermediate ply being composed of glass matrix material.

9. A method of manufacturing a composite article as set forth in claim 1
   wherein the preform of step (a) is composed of a lay up of a plurality of plies of woven cloth, each ply composed of both reinforcement fiber material and glass matrix material.

10. A method of manufacturing a glass matrix or glass-ceramic matrix composite article comprising the steps of:
    (a) providing a preform composed of a mixture of reinforcing fiber material and glass matrix material;
    (b) placing the preform in a pre-mold shaped die set;
    (c) heating the preform in the pre-mold shaped die set to a temperature sufficiently high to soften the glass powder to a deformable state;
    (d) removing the preform from the pre-mold shaped die set and deforming the preform in die means defining a shaped die cavity having a temperature below that of the preform; and
    (e) cooling the deformed preform by the natural loss of heat to the die means resulting in a composite article assuming the configuration of the shaped die cavity.

11. A method of manufacturing a glass matrix or glass ceramic matrix composite article comprising the steps of:
    (a) providing a preform composed of a mixture of reinforcing fiber material and glass matrix material;
    (b) heating the preform to a temperature sufficiently high to soften the glass powder to a deformable state;
    (c) placing the composite preform in a pre-mold which defines the final article shape;
    (d) deforming the preform in die means defining a die cavity having an initial temperature below that of the preform;
    (e) cooling the deformed preform by the natural loss of heat to the die means resulting in a composite article assuming the configuration of the shaped die cavity; and
    (f) removing both the pre-mold and the shaped composite from the die means.

* * * * *